United States Patent Office 3,578,475
Patented May 11, 1971

3,578,475
CATIONIC CEREAL FLOURS AND A METHOD FOR THEIR PREPARATION
Richard J. Alexander, Wauwatosa, and Robert G. Cummisford, Brookfield, Wis., assignors to Krause Milling Company, Milwaukee, Wis.
No Drawing. Filed Dec. 9, 1968, Ser. No. 782,438
Int. Cl. C13l 1/08
U.S. Cl. 106—150
6 Claims

ABSTRACT OF THE DISCLOSURE

A series of novel cationic cereal flours are described in which the protein portion of the flour is modified by certain tertiary amines or quaternary ammonium salts.

BACKGROUND OF THE INVENTION

Field of the invention

The present invention is particularly useful in retaining pigments and in improving dry strength properties in paper applications, and in flocculating or concentrating mineral ore suspensions.

Description of the prior art

Cationic starches, in either granular or pregelatinized form, have been the subject of numerous patents and articles in the literature. E. F. Paschall in his chapter on the production and uses of cationic starches (Starch: Chemistry and Technology, vol. II, Chapter XVI) describes the types, means of preparation and commercial applications of most of these products. The amino groups on these products impart cationic properties to the starch making them particularly useful in the paper, paperboard and mining industries.

Most of these starches are prepared from slurry reactions, in which granular starch, water, reagents and usually some inorganic salt (to inhibit swelling) are mixed together as a slurry and held (with stirring) for a few hours at 40°–50° C. (similar to the processes described in U.S. Pats. 2,813,093, 2,876,217, 3,336,292 and 3,346,-563). The starch slurry is then neutralized and dewatered, and the resulting cake is washed to remove soluble salts and by-products. The cationic starch is then dried to 10–1% moisture.

An alternate process for preparing cationic starches combines a slurry reaction with subsequent gelatinization and drying of the product on steam heated rolls. Such a process has been patented by Caldwell and Wurzburg and assigned to National Starch & Chemical Co. (U.S. Pat. 2,917,506).

Major industrial users, such as the paper and mining industries, generally employ granular cationic starches. In these applications the cationic starches are slurried in water and subjected to elevated temperature (usually by some jet or continuous cooking procedure) to form a paste or dispersion of the starch. The paste is then added to the paper pulp or mineral ore suspension, usually at levels of 1% or below based on the weight of the pulp fiber or mineral. In paper applications the cationic starches promote improvement in dry strength properties and in pigment retention (U.S. Pat. 2,935,436). In minning applications the starches flocculate certain minerals and aid in mineral ore separation or concentration (U.S. Pats. 2,975,124 and 2,995,513).

Other prior art of interest includes:

United States Patents

| No. | Author | Date |
|---|---|---|
| 2,459,108 | Lolkema | Jan. 11, 1949 |
| Re. 23,443 | Lolkema | Dec. 18, 1951 |
| 2,813,093 | Caldwell et al. | Nov. 12, 1957 |
| 2,876,217 | Paschall | Mar. 3, 1959 |
| 2,917,506 | Caldwell et al. | Dec. 15, 1959 |
| 2,935,436 | Caldwell et al. | May 3, 1960 |
| 2,975,124 | Caldwell et al. | May 14, 1961 |
| 2,995,513 | Paschall et al. | Aug. 8, 1961 |
| 3,336,292 | Kirby | Aug. 15, 1967 |
| 3,346,563 | Shilneck et al. | Oct. 10, 1967 |

Reference is also made to foreign patents:

| | | |
|---|---|---|
| 55,779 | Lolkema (Netherlands) | Jan. 15, 1944 |
| 601,374 | Scholten (Great Britain) | May 5, 1948 |

Other references:

Kerr and Neukom, Die Starke, 4, 255 (1952).
Paschall, Starch: Chemistry and Technology, vol. II, Chapter XVI.
Rankin et al., Abrstract Papers, 52nd meeting, Am. Assn. Cereal Chemists, Los Angeles, April 1967.

Since most cereal flours contain only about 80–90% starch (on a dry basis) one would not normally use cereal flours in lieu of the starches used in the above references because, at best, with the same amount of cationic reagent per gram of starch, a flour would only be about 80–90% as efficient because of the 10–20% of non-starch ingredients.

SUMMARY OF THE INVENTION

The present invention discloses the novel concept that if cereal flours are treated with certain tertiary amines or quaternary ammonium salts, instead of obtaining an inferior product with only 80–90% the efficiency of a cationic starch, a product is obtained which has unique and unexpected properties. It was discovered that, when flour thus treated was repasted or redispersed in hot water, it had flocculating and pigment retention properties superior to a cationic starch prepared under identical conditions. This was entirely unexpected as one would expect a flour product to be less active.

An object of this invention is to provide new and useful cationic flours and a process for making same. A further object is to provide cationic flours possessing unusual water solubility and repasting properties. Another object is to prepare flours whose cationic properties make them particularly useful as retention aids, dry strength additives and ore flocculants.

Yet another object is the important economic advantage of using a cereal flour instead of a more costly starch in the preparation of cationic flocculants and retention aids which can now be realized by following the teachings described herein. In addition, products superior to those presently available in the trade can now be produced. Other objects will appear hereinafter.

DESCRIPTION OF PREFERRED PROCEDURES

Our invention may be accomplished by treating a farinaceous seed flour (generally termed a cereal flour) with a tertiary amine, its acids salt or a quaternary ammonium salt in aqueous medium containing a specific quantity of alkaline catalyst. After the reaction is complete the reaction mixture is neutralized and then dried if desired.

The amount of alkali may be varied from 0.4 to 5.0% (based on flour weight); however, we prefer to use 0.8 to 3.0%. The alkali may be sodium hydroxide, potassium hydroxide or other similar strong base; however, we prefer to use sodium hydroxide.

The amount of reagent may be varied from 0.8 to 10% (based on flour weight); however, we prefer to use 2.0 to 5.0%. We have found amines, such as 2-chloroethyldiethylamine and 2-chloroethyldimethylamine (or their acid salts) and quaternary ammonium salts, such as 2,3-epoxypropyltrimethyl ammonium chloride and 4-chloro - 2 - butenyltrimethyl ammonium chloride, to be especially useful in preparing cationic flours. However, other compounds selected from the class consisting of epoxyalkyltrialkyl ammonium salts, haloalkyltrialkyl ammonium salts, epoxyalkyldialkyl amines, haloalkyldialkyl amines and the acid salts of epoxyalkyldialkyl amines and haloalkyldialkyl amines are also applicable.

We prefer to carry out the reaction at 50° C. to 70° C. for reaction times of 10 minutes to 4 hours. However time and temperature are interdependent. The reaction may be conducted at a lower temperature, but a longer time would be required. Higher reaction temperatures for shorter periods of time are also possible. Under those conditions either the reaction would be run at lower slurry solids or specialized equipment would be employed to handle the more viscous reaction mixture.

The acid used in neutralization may be any mineral acid, such as hydrochloric, sulfuric, phosphoric or nitric; however, we prefer to use hydrochloric acid. After neutralization to a pH of 3.0–7.0 the product may be dried or used without drying.

Our invention is applicable to all cereal flours including yellow corn, white corn, waxy corn, wheat, sorghum and waxy sorghum. The flour may be modified, either before or after the reaction, as with acids, oxidizing agents and the like, and it may be gelatinized or ungelatinized.

The following examples illustrate our invention but are not to be considered as limiting its scope. The examples illustrate the means by which cationic cereal flours can be prepared (Examples 1–7) and their utility in flocculating mineral suspensions, retaining pigments in paper, and improving dry strength properties (Examples 8–10).

Example 1

Six hundred grams of yellow corn flour was slurried in 900 ml. of distilled water and 96 ml. of 10% NaOH solution was added. The mixture was placed in a 2-liter round bottom flask in a water bath at 60° C. and 15.5 g. of 2-chloroethyldiethylamine hydrochloride was added. The slurry was stirred for 4 hours at 60° C. It was finally neutralized to pH 6.0 with 6 N HCl and dried on steam heated rolls at 100 p.s.i. (Product A).

Example 2

Eight hundred grams of yellow corn flour was slurried in 1200 ml. of distilled water and 64 ml. of 10% NaOH was added. The slurry was placed in a 2-liter round bottom flask in a water bath at 60° C. and 30.3 g. of 2,3 - epoxypropyltrimethyl ammonium chloride was added. After 4 hours at 60° C. the slurry was neutralized to pH 5.0 with 6 N HCl and dried on steam rolls at 100 p.s.i. (Product F).

Example 3

Three hundred grams of yellow corn flour was slurried in 475 ml. of distilled water and 57 ml. of 10% NaOH was added. The slurry was placed into a H₂O bath at 60° C. in a 1-liter beaker and 8.1 g. of 2 - chloroethyldimethylamine hydrochloride was added. After 4 hours at 60° C. the slurry was neutralized to pH 5.0 with HCl and dried on steam rolls at 100 p.s.i.

Example 4

Example 1 was repeated except that 20.7 g. of 4-chloro-2-butenyltrimethyl ammonium chloride and 69 ml. of 10% NaOH were employed.

Example 5

Three hundred grams of white corn flour was slurried in 475 ml. of distilled water and 57 ml. of 10% NaOH was added. The slurry was placed into a 60° C. water bath in a 1-liter beaker and 9.7 g. of 2-chloroethyldiethylamine hydrochloride was added. After 1 hour at 60° C. the slurry was neutralized to pH 5.0 and dried on steam rolls at 100 p.s.i. (Product U).

Example 6

Example 5 was repeated with 300 g. of grain sorghum flour (Product H).

Example 7

Three hundred grams of waxy sorghum flour was slurried into 475 ml. of distilled water and 9.7 g. of 2-chloroethyldiethylamine hydrochloride was added. The slurry was transferred to a water bath at 60° C. and 57 ml. of 10% NaOH was added. After 1 hour at 60° C. the slurry was neutralized to pH 5.0 and dried on steam rolls at 100 p.s.i.

The products described in Examples 1 through 7 were tested by the addition of 0.60% of well dispersed flour pastes (based on pulp weight) to a pulp slurry containing 10% kaolin clay (Ultra White 90), 1% rosin size and 2% alum. Handsheets were prepared and tested for ash according to standard TAPPI procedure T 413 ts–66. Values were compared to controls prepared with no flour added.

TABLE 1.—CLAY RETENTION PROPERTIES OF SEVEN CATIONIC FLOURS

| Product | Percent ash | | Percent improvement in clay retenton (over contriol) |
|---|---|---|---|
| | Control | Product | |
| Product of Example: | | | |
| 1 (A) | 3.59 | 4.79 | 33.4 |
| 2 (F) | 3.94 | 5.49 | 39.3 |
| 3 | 3.47 | 4.33 | 24.8 |
| 4 | 3.67 | 5.20 | 41.6 |
| 5 (U) | 4.02 | 5.54 | 35.3 |
| 6 (H) | 3.84 | 5.12 | 3.33 |
| 7 | 3.67 | 5.62 | 54.4 |

Example 8

This example illustrates the superior flocculating ability of the cationic cereal flours. With each of the materials tested a 1% or 2% suspension of the mineral was poured into 100 ml. graduated cylinders. A specific quantity of well dispersed 1% flour pastes was added and the flocculation rates measured. In each case values were compared with a control to which no flour had been added. Results with four different minerals are shown in the tables below.

TABLE 2

[Flocculation of a 2% suspension of kaolin clay (Ultra White 90, a clay used in coatings and as a filler in paper applications)]

| Flocculant [1] | Milliliters of clear solution above precipitate after (minutes)— | | | |
|---|---|---|---|---|
| | 3 | 10 | 30 | 60 |
| None | 0 | 0 | 0 | 0 |
| Unmodified corn flour | 0 | 0 | 0 | 0 |
| Unmodified corn starch | 0 | 0 | 0 | 0 |
| Product of Example 1 (A) | 20 | 58 | 74 | 75 |
| Product of Example 6 (H) | 8 | 28 | 60 | 70 |

[1] 2.5% by weight, or 25,000 p.p.m.

TABLE 3

[Flocculation of a 2% suspension of kaolin clay (Kaolex D-6, a clay used in mineral fiber tile, paints, adhesives and ceramics)]

| Flocculant [1] | Milliliters [2] of precipitate after (minutes)— | | | |
|---|---|---|---|---|
| | 3 | 10 | 30 | 60 |
| None | 0 | 0 | 1 | 1 |
| Unmodified corn flour | 4 | 4 | 3 | 3 |
| Product of Example 1 (A) | 34 | 24 | 20 | 16 |
| Product of Example 2 (F) | 29 | 21 | 18 | 16 |

[1] 2.5% by weight, or 25,000 p.p.m.
[2] Volume of precipitate decreased with time due additional settling.

TABLE 4

[Flocculation of a 2% suspension of calcium carbonate (Purecal M)]

| Flocculant [1] | Milliliters of clear solution above precipitate after— | | |
|---|---|---|---|
| | 30 seconds | 60 seconds | 5 minutes |
| None | 0 | 4 | [2] 18 |
| Product of Example 1 (A) | 33 | 62 | 78 |
| Product of Example 2 (F) | 33 | 61 | 77 |
| Product of Example 6 (H) | 30 | 58 | 77 |
| Product of Example 7 | 35 | 61 | 78 |

[1] 0.05% by weight or 500 p.p.m.
[2] Solution above precipitate was actually very cloudy.

TABLE 5

[Flocculation of a 1% suspension of titanium dioxide (Ti-Pure R990)]

| Flocculant [1] | Milliliters [2] of precipitate after (seconds)— | | | |
|---|---|---|---|---|
| | 30 | 60 | 90 | 120 |
| None | 0 | 0 | 0 | 0 |
| Product of Example 1 (A) | 7 | 5 | 5 | 4 |
| Product of Example 2 (F) | 9 | 9 | 8 | 7 |
| Product of Example 6 (H) | 8 | 6 | 5 | 5 |
| Product of Example 7 | 10 | 8 | 6 | 5 |

[1] 0.5% by weight, or 5,000 p.p.m.
[2] Volumes of precipitate decreased with time due to additional settling. The supernatant liquid remained turbid but contained by analyses only 10–20% of original suspended solids.

Example 9

Several of the cationic flours described in Examples 1–7 were evaluated in paper handsheets for dry strength properties. The values in Tables 6 and 7 were obtained from handsheets prepared by adding 0.5% or 1.0% of a dispersed flour paste (based on pulp weight) to a pulp slurry composed of 50% bleached kraft and 50% bleached sulfite pulps to which 1% rosin size and 2% alum had been added. Handsheets were conditioned in a constant temperature, constant humidity room and tested according to standard Tappi methods T 220 m–60, T 403 ts–63, T 404 os–61, and T 423 m–50. Pulp freeness was determined according to method T 227 m–58.

TABLE 6.—DRY STRENGTH PROPERTIES OF HANDSHEETS CONTAINING TWO CATIONIC CORN FLOURS

| Product | Percent added to pulp [1] | Mullen burst strength | Percent increase | Folding endurance | Percent increase | Tensile strength | Percent increase |
|---|---|---|---|---|---|---|---|
| A (Example 1) | 0.5 | 27.0 | 31.6 | 59.0 | 181 | 12.3 | 17.1 |
| | 1.0 | 30.2 | 47.2 | 106.0 | 404 | 12.9 | 22.8 |
| F (Example 2) | 0.5 | 26.2 | 27.8 | 53.6 | 155 | 11.2 | 6.6 |
| | 1.0 | 28.3 | 38.0 | 96.0 | 357 | 12.4 | 18.1 |
| Control [2] | | 20.5 | | 21.0 | | 10.5 | |

[1] Based on dry pulp weight.
[2] Handsheets made from pulp slurry containing 50% Celgar kraft pulp (Canadian Freeness, 366 ml.), 50% Soundview sulfite plup (Canadian Freeness, 312 ml.), 1% rosin and 2% alum (based on pulp weight).

TABLE 7.—DRY STRENGTH PROPERTIES OF THREE CATIONIC CEREAL FLOURS COMPARED TO UNMODIFIED CORN FLOUR

| Product | Mullen added to pulp [1] | Mullen burst strength | Percent increase | Folding endurance | Percent increase | Tensile strength | Percent increase |
|---|---|---|---|---|---|---|---|
| R (according to Example 1, but with 3.2% reagent instead of 2.6%). | 0.5 | 29.6 | 19.3 | 134 | 139 | 12.1 | 16.2 |
| | 1.0 | 31.2 | 25.8 | 183 | 226 | 12.7 | 22.1 |
| S (according to Example 6 but with 3.2% reagent instead of 2.6%). | 0.5 | 30.2 | 21.8 | 212 | 278 | | |
| | 1.0 | 34.0 | 37.1 | 281 | 403 | | |
| T (Product R modified with 0.08% benzoyl peroxide). | 0.5 | 28.4 | 14.5 | 127 | 127 | 12.1 | 16.3 |
| | 1.0 | 31.8 | 28.2 | 182 | 225 | 12.9 | 24.1 |
| Unmodified corn flour | 0.5 | 26.3 | 6.0 | 80 | 43 | 10.5 | 1.0 |
| | 1.0 | 26.6 | 7.3 | 81 | 45 | 11.2 | 7.7 |
| Control [2] | | 24.8 | | 56 | | 10.4 | |

[1] Based on dry pulp weight.
[2] Handsheets made from pulp slurry containing 50% Celgar kraft pulp (Canadian Freeness, 374 ml.) 50% Soundview sulfite pulp (Canadian Freeness, 373 ml.), 1% rosin and 2% alum (based on pulp weight).

Example 10

The superior pigment retention properties of the cationic cereal flours is demonstrated here by comparison with two cationic corn starches and with unmodified corn starch and corn flour. Well dispersed starch or flour pastes were added at the 0.75 level (based on pulp weight) to a pulp slurry containing 10% TiO₂ Ash values were compared to controls prepared with no starch or flour added.

TABLE 8.—RETENTION OF TiO$_2$ IN HANDSHEETS BY SEVERAL CATIONIC PRODUCTS

| Product | Percent ash | | Percent improvement in TiO$_2$ retention (over control) |
|---|---|---|---|
| | Control | Product | |
| A (Example 1) | 1.88 | 6.44 | 243 |
| F (Example 2) | 1.88 | 6.45 | 244 |
| U (Example 5) | 1.67 | 6.14 | 268 |
| H (Example 6) | 1.40 | 5.70 | 307 |
| C (cationic corn starch, Example 12) | 1.83 | 5.65 | 209 |
| V (cationic corn starch according to Example I of U.S. Pat. 2,917,506) | 1.37 | 3.66 | 167 |
| Corn starch | 1.64 | 1.78 | 8.5 |
| Corn flour | 1.60 | 1.75 | 9.3 |

It appears that a chemical modification of the protein fraction has taken place in the preparation of cationic flours. This modification affects the solubility and chemical properties of the protein as well as those of the cereal flour as a whole.

Because of the complexity of the composition of the cationic cereal flours there are several chemical reactions which might have taken place. The protein fraction contains various reactive sites at which the reaction probably occurs. Any amino acid within the protein molecules possessing groups which contain an active hydrogen atom, such as an hydroxyl group (present on amino acids threonine, serine and tyrosin), free amino groups (present on amino acids arginine, lysine, histidine, tryptophan and proline) and sulfhydryl groups (present on cysteine), to mention a few, could take part in the reaction with either the tertiary amines or the quaternary ammonium salts of this invention to produce cationic protein molecules having the following general structure:

Protein—A—R where A=NH, N, O or S
and where R is an aliphatic group bearing either a tertiary amino or a quaternary ammonium group.

The starch portion of the cereal flours also contains hydroxyl groups at which part of the reaction could occur to produce modified starch molecules having the following general structure:

Starch—OR where R is an aliphatic group bearing either a tertiary amino or quaternary ammonium group.

The reaction conditions could also enhance the reactivity of the protein portion of the cereal flour since up to 86% of the protein is soluble in the aqueous alkaline flour slurries employed. In the process of becoming soluble the protein molecules tend to unravel and make more reactive sites available. The cationic reagents are also soluble in the aqueous flour slurries, and reactions generally occur more readily under such homogeneous conditions.

Alkaline reaction conditions also promote saponification of peptide bonds (the bonds which hold the amino acids together within the protein molecules). Saponification produces additional free amino groups which very probably enter into the reaction. This increase in free amino groups was demonstrated by using a dye (Naphthol Blue-Black) which is attracted to and adsorbed by a product containing free amino groups; as the number of groups increases the amount of dye bound to the product increases. This is shown in Example 11.

Example 11

Tten grams of unmodified yellow corn flour was slurried in 30 ml. of distilled water and 2.0 ml. of 2.5 N sodium hydroxide was added. The alkaline slurry was stirred for 5 min. at room temperature and then neutralized with approximately 1 ml. of 6 N hydrochloric acid. The resulting slurry was added to 200 ml. of a standard solution of Naphthol Blue-Black dye [1] and the mixture was stirred in a Waring Blendor for 5 min. The mixture was then filtered and 4.0 ml. of the filtrate was diluted to 100 ml. in a volumetric flask. The procedure was repeated with 10 g. of unmodified corn flour except no sodium hydroxide or hydrochloric acid were employed.

The optical densities of the two solutions were determined at 615 m$\mu$ on a Bausch and Lomb Spectronic 20 spectrophotometer and the results are shown in Table 9. The 10-fold decrease in optical density of the diluted filtrate from the alkali terated flour indicates an increase in free amino groups.

TABLE 9

Dye binding of untreated and alkali treated corn flours

| Product: | Optical density of diluted filtrates @ 615 m$\mu$ |
|---|---|
| Treated flour | 0.020 |
| Untreated flour | 0.225 |

[1] The dye solution was prepared by dissolving 1.066 g. of Naphthol Blue-Black dye, 21.4 g. of citric acid (monohydrate) and 1.0 ml. of propionic acid in distilled water and diluting to the mark in a 1-liter volumetric flask. The solution was standardized to an optical density of 0.320 at 615 m$\mu$ by the addition of either Naphthol Blue-Black dye or citric acid.

On comparing two flours processed under identical conditions, except that one flour was treated with 2-chloroethyldiethylamine hydrochloride and one was not, it was found that significantly more protein was soluble in both 75% aqueous methanol solution and in a copper ammonium sulfite solution with the cationic flour than with the untreated flour. These findings are described in detail in the following example.

Example 12

Product A was a cationic yellow corn flour prepared according to the procedure described in Example 1. Product B was a yellow corn flour treated and processed in the same manner as Product A except that no cationic reagent (2 - chloroethyldiethylamine hydrochloride) was employed.

Twenty grams of each product was mixed (separately) with 400 ml. of 75% methanol for 5 min. in a Waring Blendor. The slurries were centrifuged and the residue was washed (twice) with 75% methanol and re-centrifuged. The products were finally slurried in 100% methanol, filtered, dried and nitrogen was determined by the Kjeldahl method.

In a parallel experiment 20 g. of each product was slurried into 400 ml. of a solution containing 2.5 g. of CuSO$_4$·5H$_2$O, sufficient conc. NH$_4$OH to form the Cu(NH$_3$)$_4$SO$_4$ complex, 3.2 g. of Na$_2$SO$_3$ and 62 ml. of 0.1 N NH$_4$OH. After stirring for 1.5 hour at room temperature the slurries were centrifuged, washed with 0.1 N NH$_4$OH (twice) and distilled water (twice) until no blue color remained in the wash water. The products were finally slurried in 50% methanol, neutralized to pH 3.0 with 6 N HCl, filtered, washed and dried. Analyses (Table 10) indicated that in the cationic flour 13 to 24% more protein was soluble.

TABLE 10.—COMPARATIVE PROTEIN SOLUBILITY OF CORN FLOUR AND CATIONIC CORN FLOUR

| Product | Initial percent protein | Percent protein after 75% methanol extraction | Percent of protein solubilized | Percent protein after Cu(NH$_3$)$_4$SO$_3$ extraction | Percent of protein solubilized |
|---|---|---|---|---|---|
| A cationic corn flour | 8.84 | 6.64 | 24.9 | 3.75 | 57.6 |
| B unreacted corn flour | 8.30 | 8.20 | 1.2 | 4.65 | 44.0 |

Further evidence that protein modification occurred, and that the cationic protein is responsible for the superior cationic properties of the cereal flours, was obtained by comparing cationic products with and without added protein. Results of paper handsheet studies indicated that the product which contained protein promoted improvement in pigment retention of 244% compared to 181% for the cationic starch. This finding is described in Example 13.

Example 13

Product C was a cationic corn starch prepared by slurrying 270 g. of commercial corn starch into 500 ml. of distilled water, adding 9.7 g. of 2-chloroethyldiethylamine hydrochloride, heating this slurry to 60° C., adding 57 ml. of 10% NaOH and reacting for 1 hour. The slurry was finally neutralized to pH 4.5 and dried on steam heated rolls.

Product D was prepared according to the procedure used with Product C except that the corn starch was added to 500 ml. of a solution containing about 13 grams of protein. The protein was obtained by adding 53 ml. of 10% sodium hydroxide solution to a slurry of 350 g. of yellow corn flour in 900 ml. of distilled water; after stirring at room temperature for one hour, the flour slurry was centrifuged and the soluble protein layer was neutralized to pH 6.5 with 6 N HCl. Product C contained 0.45 nitrogen (dry basis) and Product D contained 1.15%.

The products were compared by adding 0.25% of well dispersed pastes (based on pulp weight) to pulp slurry containing 10% kaolin clay (Ultra White 90). Results (Table 11) show that the product prepared with added protein was superior to the cationic starch.

TABLE 11.—EFFECT OF PROTEIN COMPONENT ON CLAY RETENTION PROPERTIES

| Product | Percent ash | | Percent improvement in clay retention (over control) |
|---|---|---|---|
| | Control | Product | |
| C from starch | 1.14 | 3.20 | 181 |
| D from starch plus protein | 1.41 | 4.85 | 244 |

As indicated above, cationic cereal flours prepared in a slurry reaction and processed on steam rolls are essentially insoluble in cold water as compared to the water soluble starches prepared by the same process (U.S. Pat. 2,917,506). Generally speaking, all starch ethers and esters processed on steam heated rolls are water soluble as described by Jan Lolkema (U.S. Pat. 2,459,108, Reissue 23,443, Dutch Pat. 55,779 and British Pat. 601,-374). Hence the insolubility of our cationic cereal flours is quite unexpected.

The superior flocculating and pigment retention properties of the cationic cereal flours can only be realized by re-pasting or redispersing these materials in hot water. With the addition of 1% cationic yellow corn flour (based on pulp weight) to a paper pulp slurry containing 10% titanium dioxide pigment ($TiO_2$), an improvement in pigment retention of 332% was obtained with the re-pasted flour compared to only 72% improvement when the flour was not re-pasted. In a similar test with a cationic starch, a much smaller difference was observed between material with and without re-pasting. These results are shown in the following example.

Example 14

Product A is a cationic corn flour prepared according to the procedure described in Example 1. Product E is a cationic corn starch prepared as in Example 1 except that only 540 g. of corn starch was employed (to correspond to the same amount of starch in 600 g. of corn flour).

The uncooked (or undispersed) products were tested by stirring a 2% mixture of flour or starch at room temperature for 30 minutes. The cooked products were tested by heating a 2% mixture of flour or starch at 95° C. for 30 minutes. Samples of each product were then added at 1% addition levels (based on pulp weight) to a pulp slurry containing 10% $TiO_2$ and paper handsheets were prepared. Ash values were obtained according to standard Tappi method T 413 ts–66. Values were compared to handsheets prepared with no starch or flour added (Table 12).

TABLE 12.—RETENTION OF $TiO_2$ BY CATIONIC STARCH AND CATIONIC FLOUR WITH AND WITHOUT COOKING

| Product | Percent ash | | Percent improvement in $TiO_2$ retention (over control) |
|---|---|---|---|
| | Control | Product | |
| A uncooked, from flour | 1.38 | 2.38 | 72 |
| A cooked, from flour | 1.30 | 5.62 | 332 |
| E uncooked, from starch | 1.36 | 4.69 | 245 |
| E cooked, from starch | 1.45 | 5.57 | 284 |

About 10–20% of the cationic flours is cold water soluble. This soluble fraction contains mainly soluble starch and salt which were not washed out of the final neutralized slurry. It does not contain any significant amount of modified protein, which appears to be insolubilized during drying. Furthermore, this soluble fraction has essentially no cationic activity. A portion of the soluble fraction of a cationic corn flour was added at the 0.75% level (based on pulp weight) to a paper pulp slurry containing $TiO_2$, and only 15% improvement in pigment retention was obtained compared to 290% improvement for the entire cationic flour. The residue of the same flour after removal of the solubles was tested at 80% of the 0.75% solids level and 291% improvement in pigment retention, essentially the same as before removing solubles, was obtained. Thus a further improvement in the effectiveness of cationic flours could be achieved by washing out the inactive water soluble fraction. The results of these experiments are summarized in Example 15.

Example 15

A sample of cationic yellow corn flour, prepared according to Example 1, was found to contain 20.0% cold water solubles. This soluble portion, the original flour, and the residue obtained after removing the solubles were tested separately for pigment retention properties. Well dispersed pastes of each product were added at the 0.75% level (based on pulp weight) to a pulp slurry containing 10% $TiO_2$. Ash values from handsheets were compared to a control with no flour added. Results show that the soluble portion had essentially no cationic activity. The original flour and flour residue were identical (Table 13).

TABLE 13.—RETENTION OF $TiO_2$ BY SOLUBLE AND INSOLUBLE FRACTIONS OF CATIONIC FLOUR

| Product | Percent ash | | Percent improvement in $TiO_2$ retention (over control) |
|---|---|---|---|
| | Control | Product | |
| Cationic corn flour | 1.53 | 5.96 | 290 |
| Insoluble fraction [1] | 1.49 | 5.83 | 291 |
| Soluble fraction | 1.43 | 1.65 | 15 |

[1] Product actually tested at 80% of the 0.75% normally added to the pulp slurry to correct for removal of 20% solubles.

Another novel feature of the cationic flours is that they cannot be prepared by the slurry processes used commercially to manufacture granular, ungelatinized cationic starches. When the teachings of Caldwell and others (U.S. Pats. 2,813,093, 2,876,217, 3,336,292) were applied to cereal flours products were obtained which had only mediocre retention and flocculating properties. This feature is described in more detail in the following example.

Example 16

A cationic corn flour was compared to a similar flour prepared in a granular slurry reaction. Product F was the corn flour prepared in Example 2. Product G was prepared under the same conditions except that 240 g. of sodium sulfate was dissolved in the slurry water to inhibit granular swelling; the slurry was purified by filtering and washing the filter cake with water; and the product was air dried. Product F was found to contain 16.5% more nitrogen than Product G (1.55% vs. 1.33%).

The products were tested by adding 0.25% (based on pulp weight) of well dispersed flour pastes to a paper pulp slurry containing 10% $TiO_2$. Results from handsheet testing indicate that the unpurified cationic flour was superior (Table 14).

TABLE 14.—RETENTION OF $TiO_2$ BY UNPURIFIED AND PURIFIED CATIONIC FLOURS

| Product | Percent ash | | Percent improvement in $TiO_2$ retention (over control) |
|---|---|---|---|
| | Control | Product | |
| F Example 2 | 2.28 | 5.96 | 162 |
| G purified cationic flour | 2.33 | 3.58 | 54 |

Another feature of the cationic cereal flours is that drying does not appear to promote any changes in the cationic properties of the products and is not essential to the process. The advantage of drying is only in providing a product in a convenient form. This finding is shown in Example 17.

Example 17

A cationic sorghum flour slurry was prepared according to Example 6. Part of the slurry was passed over steam heated rolls (Product H) and part of the slurry was diluted to 6% solids and heated at 95° C. for 30 minutes (Product J). A portion of Product H was then dispersed in hot water, and the two flour pastes were tested (separately) by addition at the 0.75% level (based on pulp weight) to a paper pulp slurry containing 10% kaolin clay (Ultra White 90). Ash values from handsheets indicated that the products were essentially the same (Table 15).

TABLE 15.—SIMILARITY OF CLAY RETENTION BY CATIONIC FLOURS WITH AND WITHOUT DRYING

| Product | Percent ash Control | Percent ash Product | Percent improvement in clay retention (over control) |
|---|---|---|---|
| H dried | 1.50 | 3.68 | 145 |
| J undried | 1.85 | 4.49 | 143 |

If a dried cationic flour is desired, the nature of the drying process is not critical. The final flour slurry may be dried by any convenient method including roll drying and spray drying without changing its cationic properties. Roll drying results in a gelatinized or partially gelatinized product while spray drying produces a product which is ungelatinized or very slightly gelatinized. The important feature is that the entire reaction mixture must be dried without washing or other purification steps in order to retain modified protein and produce a product with superior cationic properties. The similar performance of roll dried and spray dried products is shown in Example 18.

Example 18

Eleven thousand grams of yellow corn flour was slurried into 19 liters of tap water at 62° C. in a 10 gallon insulated vessel and 356 g. of 2-chloroethyldiethylamine hydrochloride was added. Two liters of 10% NaOH was added over a 15 minute period and the reaction was allowed to proceed at 55° C. for 1½ hours. The slurry was neutralized to pH 4.2 with 6 N HCl and 8.8 g. of benzoyl peroxide was added. After 45 minutes part of the slurry was passed over steam rolls at 100 p.s.i. Part of the slurry was dried in a laboratory spray drier at various inlet temperature and feed rates (Table 16).

The dried products were dispersed in hot water and tested at the 0.60% addition level (based on pulp weight) in paper handsheets containing $TiO_2$ and kaolin clay (Ultra White 90). Results shown in Table 16 indicate that the products were very similar in pigment retention properties.

Our invention requires a tertiary amine (or its acid salt), such as 2-chloroethyldiethylamine, or a quaternary ammonium salt, such as 2,3-epoxypropyltrimethyl ammonium chloride, to provide the cereal flour with sufficient cationic charge to promote high levels of pigment retention and rapid flocculation rates. Reagents such as ethyl-enimine (as described by Kerr in Die Starke, 4, 255, 1952) or N-(2 - hydroxyethyl)ethylenimine, which produce primary and secondary amino groups, respectively, in reactions with cereal flours and starches, are not well suited for aqueous slurry reactions. In addition, cationic cereal flours prepared with these reagents by other processes (as described by Rankin et al., Abstract Papers, 52nd Meeting, Am. Assn. Cereal Chemists, Los Angeles, April 1967) do not exhibit the same superior properties as do the cationic flours prepared using a tertiary amine or a quaternary ammonium salt. This is shown in Examples 19, 20 and 21.

Example 19

A cationic corn flour (Product F) prepared according to Example 2 was compared with four ethylenimine treated flours (Products K–N). The latter were prepared by spraying liquid ethylenimine into a rapidly agitating beaker of dry flour (10% moisture) and heating the resulting mixture at 60° C. for 4 hours in an enclosed vessel. The products were finally neutralized to pH 4.0–6.0 with gaseous HCl. All the flours were then tested by adding 0.5% (based on pulp weight) of the flours dispersed in hot water to a paper pulp slurry containing 2% rosin, 4% alum and 10% $TiO_2$. Results in Table 17 indicate that the ethylenimine treated flours had very poor retention properties.

TABLE 17.—COMPARISON OF A CATIONIC CORN FLOUR WITH FOUR ETHYLENIMINE TREATED FLOURS

| Product | Percent ethylenimine employed | Percent ash | Percent improvement in $TiO_2$ retention (over control) |
|---|---|---|---|
| F (Example 2) | | 7.31 | 44.7 |
| K | 2.0 | 4.97 | 0.0 |
| L | 4.0 | 4.87 | 0.0 |
| M | 6.0 | 5.14 | 1.8 |
| N | 8.0 | 5.29 | 4.9 |
| Control | | 5.05 | |

Example 20

The product from Example 1 (Product A) was compared to a flour treated with 9.7% N-(2 - hydroxyethyl)-ethylenimine (Product P). The latter was prepared by mixing the liquid N-(2-hydroxyethyl)-ethylenimine and the flour and heating the resultant mixture to 90°–100° C. for four hours in an enclosed vessel. The products were tested by addition at the 0.60% level (based on pulp weight) to a paper pulp slurry containing 10% $TiO_2$, 1% rosin size and 2% alum. Results (Table 18) show the cationic corn flour from Example 1 to be superior.

TABLE 18.—COMPARISON OF A CATIONIC CORN FLOUR WITH CORN FLOUR TREATED WITH N-(2 HYDROXYETHYL) ETHYLENIMINE

| Product | Percent ash Control | Percent ash Product | Percent improvement in $TiO_2$ retention (over control) |
|---|---|---|---|
| A (Example 1) | 4.30 | 6.54 | 52 |
| F (Flour treated with N-(2 hydroxyethyl) ethylenimine) | 5.21 | 6.15 | 18 |

TABLE 16.—COMPARISON OF ROLL-DRIED AND SPRAY-DRIED CATIONIC CORN FLOURS

| Product | Spray drying processing conditions Inlet temperature (° C.) | Spray drying processing conditions Type of heat employed | $TiO_2$ retention Percent ash Control | $TiO_2$ retention Percent ash Product | $TiO_2$ retention Percent improvement in $TiO_2$ retention (over control) | Clay retention Percent ash Control | Clay retention Percent ash Product | Clay retention Percent improvement in clay retention (over control) |
|---|---|---|---|---|---|---|---|---|
| Roll-dried cationic flour | Roll dried at 100 p.s.i. | | 5.41 | 6.33 | 17.0 | 3.77 | 5.29 | 40.3 |
| Spray-dried cationic flour | 160°–176° | Electric | 5.50 | 6.47 | 17.6 | 3.70 | 5.10 | 37.8 |
| Do | 188°–189° | do | 5.01 | 6.01 | 20.0 | 3.60 | 4.81 | 33.6 |
| Do | 208°–228° | do | 5.12 | 6.18 | 20.7 | 3.57 | 4.88 | 36.6 |
| Do | 300°–308° | Gas | 5.52 | 6.56 | 18.8 | 3.64 | 4.74 | 30.2 |

Example 21

Product A (from Example 1) was also compared to a flour treated with 3% ethylenimine according to the procedure described by Rankin et al. (Product Q). The products were tested by addition at the 0.60% level (based on pulp weight) to a pulp slurry containing 10% kaolin clay (Ultra White 90). 1% rosin size and 2% alum. Results show the product from Example 1 to be superior (Table 19).

TABLE 19.—COMPARISON OF CATIONIC CORN FLOUR OF THIS INVENTION WITH KNOWN CATIONIC CORN FLOUR

| Product | Percent ash | | Percent improvement in clay retention (over control) |
|---|---|---|---|
| | Control | Product | |
| A (Example 1) | 3.74 | 5.72 | 53 |
| Q Flour treated with ethylenimine | 3.48 | 4.07 | 17 |

What we claim is:

1. A method of manufacturing a cationic cereal flour which consists in treating a cereal flour selected from the class comprising yellow corn, white corn, waxy corn, wheat, sorghum, and waxy sorghum while in an aqueous medium containing an alkaline catalyst with a reagent selected from the class consisting of epoxyalkyltrialkyl ammonium salts, haloalkyltrialykyl ammonium salts, epoxyalkyldialkyl amines, haloalkyldialkyl amines, and the acid salts of epoxyalkyldialkyl amines and haloalkyldialkyl amines in which the amount of the reagent is between 0.8 and 10% of the weight of the flour, and adjusting the pH of the reaction mixture to 3.0 to 7.0 by the addition of a mineral acid, wherein the alkaline catalyst is a strong base and is between 0.4 and 5.0% of the weight of the flour.

2. A method of manufacturing a cationic cereal flour as claimed in claim 1 in which the reagent is selected from the class consisting of 2-chloroethyldiethylamine, 2-chloroethyldiethylamine hydrochloride, 2,3-epoxy-propyl-trimethyl ammonium chloride, 4-chloro-2-butenyltrimethyl ammonium chloride, 2-chloroethyldimethylamine, and 2-chloroethyldimethylamine hydrochloride.

3. A method of manufacturing a cationic cereal flour as claimed in claim 1 in which the reaction is carried out at a temperature of between 50° C. and 70° C. for a period of ten minutes to four hours.

4. A method of manufacturing a cationic cereal flour as claimed in claim 1 in which the entire reaction mixture including all of the protein is dried.

5. A cationic cereal flour in which the modified protein molecules have the following general structure;

Protein—A—R and the modified starch molecules have the following general structure:

Starch—OR where A=O, N, NH, or S and where

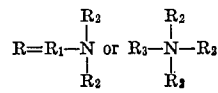

where $R_1 = C_2C_4$, $C_3H_6$ or $C_3H_5OH$
$R_2 = CH_3$ or $C_2H_5$ and
$R_3 = C_2H_4$, $C_3H_6$, $C_3H_6OH$ or $C_4H_6$ (2-butenyl)

6. A cationic cereal flour as claimed in claim 5 in which the flour is selected from the class comprising yellow corn, white corn, waxy, wheat, sorghum and waxy sorghum.

References Cited

UNITED STATES PATENTS

| 3,522,238 | 7/1970 | Rankin et al. | 260—233.5 |
| 2,158,525 | 2/1939 | Bauer et al. | 106—150 |
| 2,212,557 | 8/1940 | Bauer | 106—150 |
| 2,443,290 | 6/1948 | Bauer | 106—150 |
| 2,459,108 | 1/1949 | Lolkema. | |
| 2,466,172 | 4/1949 | Kesler et al. | 106—150 |
| 2,876,217 | 3/1959 | Paschall. | |
| 2,917,506 | 12/1959 | Caldwell et al. | |
| 2,975,124 | 3/1961 | Caldwell et al. | |
| 2,995,513 | 8/1961 | Paschall et al. | |
| 3,251,702 | 5/1966 | Stickley et al. | 106—150 |
| 3,251,703 | 5/1966 | Fortney, Jr. et al. | 106—150 |
| 3,336,292 | 8/1967 | Kirby. | |
| 3,346,563 | 10/1967 | Shildneck et al. | |
| 3,459,632 | 8/1969 | Caldwell et al. | 127—32 |
| 3,467,647 | 9/1969 | Benninga | 260—233.3 |

DONALD J. ARNOLD, Primary Examiner

JOHN H. MILLER, Assistant Examiner

U.S. Cl. X.R.

260—233.3

UNITED STATES PATENT OFFICE
CERTIFICATE OF CORRECTION

Patent No. 3,578,475            Dated May 11, 1971

Inventor(s)      Richard J. Alexander et al.

It is certified that error appears in the above-identified patent and that said Letters Patent are hereby corrected as shown below:

Column 1, line 47, "1%" should read -- 12% --. Column 4, TABLE 1, fourth column, line 6 thereof, "3.33" should read -- 33.3 --. Column 7, line 46, "Tten" should read -- Ten --; line 74, "terated" should read -- treated --.

Signed and sealed this 30th day of November 1971.

(SEAL)
Attest:

EDWARD M. FLETCHER, JR.          ROBERT GOTTSCHALK
Attesting Officer                Acting Commissioner of Patents